United States Patent [19]

Toy et al.

[11] Patent Number: 4,761,271
[45] Date of Patent: Aug. 2, 1988

[54] METHOD FOR TREATING DESTABILIZED, FIRE-INVOLVED ELEMENTAL PHOSPHORUS

[75] Inventors: Arthur D. F. Toy, Stamford, Conn.; Fred Jaffe, Ossining, N.Y.

[73] Assignee: Stauffer Chemical Company, Westport, Conn.

[21] Appl. No.: 41,962

[22] Filed: Apr. 24, 1987

[51] Int. Cl.$^4$ ..................... C01B 25/01; C01B 25/02; C01B 25/04
[52] U.S. Cl. ..................................... 423/265; 423/322
[58] Field of Search ............... 423/322, 323, 265, 266, 423/267

[56] References Cited

U.S. PATENT DOCUMENTS 3,436,184  4/1969  Hinkebein ........................... 423/322
3,515,515  6/1970  Hinkebein ........................... 423/322

OTHER PUBLICATIONS

Accident Prevention Manual for Industrial Operations, 6th ed., (1968), pp. 1367–1368.
Chemical Abstracts, vol. 96, 109671c (1982).
Lafornara et al., the Disposal of Fire Damaged White Phosphous Drums, Control Hazard Mater Spills, 1980, pp. 58–64.
Lawless et al., "Kinetics of the Reaction Between Phosphine and Sodium Hypochlorite in Alkaline Solution", J. Chem. Society, 4200–4205, 1962.

Primary Examiner—Gregory A. Heller

[57] ABSTRACT

Destabilized elemental phosphorus, for example resulting from fire involvement due to exposure with air, can be treated by placing the destabilized elemental phosphorus in the presence of a weakly basic aqueous solution of an alkali metal hypochlorite as a blanketing agent. Sodium hypochlorite is preferred.

2 Claims, No Drawings

METHOD FOR TREATING DESTABILIZED, FIRE-INVOLVED ELEMENTAL PHOSPHORUS

BACKGROUND OF THE PRESENT INVENTION

1. Field of the Present invention

The present invention relates to a method of treating elemental phosphorus, e.g., the safe storing of destabilized elemental phosphorus after it has become fire involved.

2. Description of the Prior Art

Elemental phosphorus (also commonly referred to in the art as "$P_4$") is a well known, highly pyrophoric material. When elemental phosphorus is exposed to air it spontaneously combusts. If phosphorus is inadvertently spilled, it is taught that it should be immediately covered with water, i.e. as a blanketing agent, to quench the fire that will result. See, for example, Accident Prevention Manual for Industrial Operations, 6th Edition, page 1367 (1969).

Although the quenching of a phosphorus fire by use of water overcomes the immediate problem of combustion of the phosphorus, a number of serious dangers still exist. For example, the burning of the phosphorus produces phosphorus pentoxide, phosphorus trioxide, and other by-products which, when dissolved in the water which is used to douse the fire, form polyphosphoric, phosphoric, and phosphorous acids which can lead to attack of the metal surfaces of any containers (tanks, drums, and the like) into which the fire-involved elemental phosphorus and water quenching agent are thereafter placed, thereby causing the generation of hydrogen gas. Also, phosphine gas is sometimes produced when elemental phosphorus is exposed to moist air, and this compound also poses a spontaneous fire hazard. The presence of any produced hydrogen gas can lead to the danger of explosion due to burning, especially in the presence of self-igniting phosphine in any container or drum containing the doused phosphorus material. This danger of secondary explosion is exacerbated when the build-up of hydrogen is ignited by the spontaneous burning of the phosphine gas.

The need therefore exists for a method of insuring that the destabilized, fire-involved elemental phosphorus material with its concomitant dangerous by-products (phosphorus-based acids, phosphine, hydrogen, and the like) are present in an aqueous blanketing solution under conditions which do not give rise to such dangers as corrosion of containers holding such compositions, explosion dangers, or fire dangers. Recently, it was reported in "The Disposal of Fire Damaged White Phosphorus Drums", by J. P. Lafornara et al., Control Hazard. Mater. Spills, Proc. Natl. Conf. 1980, pp. 58–64 that only two options exist for disposal of drums of fire damaged phosphorus: namely, burial or controlled detonation (see p. 62).

SUMMARY OF THE PRESENT INVENTION

The present invention relates to the storing of destabilized, previously fire-involved, elemental phosphorus in the presence of a weakly alkaline aqueous solution of an alkali metal hypochlorite as a blanketing agent to prevent such dangers as secondary explosions of any containers or drums containing the water, destabilized phosphorus, and any of the aforementioned undesired by-products. The hypochlorite of choice is sodium hypochlorite in view of its cheapness and ready availability.

DETAILED DESCRIPTION OF THE PRESENT INVENTION

As mentioned before, the present invention involves the storing of a destabilized elemental phosphorus material, which has been previously fire involved, in a blanketing layer of aqueous alkali metal hypochlorite under weakly basic conditions. One hypochlorite of choice is sodium hypochlorite in view of its ready availability and cheapness. Generally speaking, the concentration of the sodium hypochlorite in the aqueous blanketing composition can be on the order of about 3–5% by weight, and the solution should be weakly basic, having pH of about 7.5–10 or so.

After the phosphorus fire has been doused with water, the destabilized elemental phosphorus material (and its dousing water blanket) resulting from the fire involvement, due to exposure with oxygen in the atmosphere, is placed in the presence of a weakly basic, aqueous solution of the alkali metal hypochlorite as a blanketing agent. This hypochlorite active ingredient in the blanketing composition acts to continuously and progressively react with any undesired phosphine that might be present while the weakly basic nature of the solution neutralizes any phosphorusbased acids that are present due to the contact of water with the $P_2O_5$ and $P_2O_3$ values generated by the oxidation of the elemental phosphorus upon its exposure to oxygen in the air. If necessary, pH adjustment of the aqueous hypochlorite blanketing agent by addition of trisodium phosphate and/or caustic can be employed. The weakly basic, hypochlorite-based blanketing agent of the present invention provides an intrinsically more safe system than simple water immersion of the elemental phosphorus as suggested by the prior art. The hypochlorite blanketing agent used herein is readily available and cheap in those cases in which sodium hypochlorite is selected as the hypochlorite agent.

The present invention will be further illustrated by the Example which follows.

EXAMPLE

A 1.0 gram (0.032 gram atoms) chunk of white phosphorus was placed in a 150 millimeter diameter by 100 millimeter deep crystallization dish. It was ignited in air by heating with a bunsen burner.

The fire was doused by means of a 3% NaOCl solution. The solution was made by diluting 150 milliliters of commercial CLOROX bleach, which is a 5% solution of NaOCl in NaOH, with 100 milliliters water to give a 3% NaOCl solution. When 200 milliliters of solution was poured over the burning phosphorus, the fire extinguished immediately, and the phosphorus was completely covered. The solution pH was 4.0. Adding the remaining 150 milliliters of NaOCl solution raised the pH to 7.5. Active hypochlorite was present as evidenced by its bleaching action on pH paper.

The residual phosphorus had a red crust on it that disappeared on standing about one month at room temperature under the hypochlorite solution. After three months, the solution pH was 4.0 and the phosphorus residue was clean. It burned readily when dried in air.

This experiment demonstrated that a phosphorus fire would be rapidly quenched to give a non-acidic mixture that would not attack steel drums and generate hydrogen. That the unreacted phosphorus would be clean and recoverable for reuse was also shown.

The forgoing Example is set forth for illustrative purposes only and should not be construed in a limiting sense. The scope of protection that is sought is set forth in the claims which follow.

We claim:

1. A method of storing destabilized elemental phosphorus, which had been previously fire involved, in the presence of a weakly aqueous solution of an alkali metal hypochlorite as a blanketing agent, said aqueous solution having a pH ranging from about 7.5 to about 10.

2. A method as claimed in claim 1 wherein the hypochlorite is sodium hypochlorite.

* * * * *